United States Patent [19]

Kutney

[11] 4,314,681
[45] Feb. 9, 1982

[54] DRAG-REDUCING COMPONENT

[75] Inventor: John T. Kutney, Cincinnati, Ohio

[73] Assignee: General Electric Company, Cincinnati, Ohio

[21] Appl. No.: 71,524

[22] Filed: Aug. 31, 1979

[51] Int. Cl.³ .................... B64D 27/00; B64C 21/10
[52] U.S. Cl. .................................. 244/54; 244/130; 244/200
[58] Field of Search ................ 244/54, 55, 130, 200

[56] References Cited
U.S. PATENT DOCUMENTS

| | | | |
|---|---|---|---|
| 2,967,030 | 1/1961 | Whitcomb | 244/130 |
| 2,990,142 | 6/1961 | Ferri | 244/53 R |
| 3,533,237 | 10/1970 | Rabone et al. | 244/54 |
| 3,765,623 | 10/1973 | Donelson et al. | 244/53 B |
| 3,806,067 | 4/1974 | Kutney | 244/53 R |

OTHER PUBLICATIONS

"Citation 500 Mod by Astec: #170G's," NBAA Convention News, Sep. 27, 1977.

Primary Examiner—Charles E. Frankfort
Attorney, Agent, or Firm—Donald W. Walk; Derek P. Lawrence

[57] ABSTRACT

A drag-reducing structure is provided on a pylon that suspends a wing-mounted engine. The structure reduces drag by preventing ambient airflow, in a region between the wing, pylon, and engine, from accelerating to supersonic velocities and causing shock waves resulting in excessive drag. In one embodiment, the structure is a broad fairing on the inboard vertical surface of the pylon. In another embodiment, the structure is a tapered bump mounted at the inboard intersection between the wing and pylon.

8 Claims, 9 Drawing Figures

DRAG-REDUCING COMPONENT

BACKGROUND OF THE INVENTION

1. Field of the Invention

This invention relates to drag-reducing components located in the vicinity of wing-mounted aircraft engines.

2. Prior Art

In the normal practice of aircraft design and development, various manufacturers and designers must combine their individual efforts to arrive at a final configuration of a production aircraft. No single corporation or entity has the responsibility of developing all of the individual components required to power and lift a jet airplane. The practice of combining efforts is particularly evident in structures associated with wing-mounted engines on commercial jet airplanes. Responsibilities are typically divided between an engine manufacturer, designing, and supplying the engine and sometimes the nacelle, and an airframe manufacturer that develops and supplies the pylon and wing.

Normally, each of these individual manufacturers independently develops the final details of the physical package for their respective aircraft component and then cooperates with the other manufacturer to develop interface components. This combination of efforts has, in the past, resulted in complete, integrated, properly operating jet aircraft.

Each manufacturer also analyzes aerodynamic effects, including resistance drag, of their individual components. Before the aircraft is assembled, an experimentally determined value of aerodynamic drag of each of the individual components is added together to arrive at a total estimated resistance drag of the entire assembled aircraft. Often, this summation value is a reasonable approximation of the actual drag of the assembled aircraft as measured in actual flight. But, suprisingly, in many actual aircraft the measured drag is significantly higher than the value calculated by summing the drag of the individual components. The result is that the total drag of the assembled airplane is often higher as a result of optimizing the drag characteristics of the individual components on an isolated basis, in comparison to what might be achieved by optimizing the drag characteristics of the fully assembled package.

Various theories have been offered for this higher than expected drag but, until recently, the cause has not been known. Extensive testing conducted in connection with the present invention has uncovered a flow phenomena occurring in the region of wing-mounted engines. Analysis of the test results has revealed that certain portions of the ambient airflow in the vicinity of wing-mounted engines are achieving supersonic velocities, shocking and separating, causing high aircraft drag. Further analysis by the inventor has revealed that the airflow reaches supersonic velocity because of a channeling effect on the airflow at the inboard sides of pylons suspending wing-mounted engines.

SUMMARY OF THE INVENTION

It is, therefore, an object of the present invention to reduce aerodynamic drag caused by ambient air achieving supersonic velocities in the region of wing-mounted engines on jet aircraft flying at subsonic Mach numbers.

It is another object of the present invention to prevent ambient airflow in regions surrounding wing-mounted aircraft engines from achieving supersonic velocities and causing excessive aerodynamic drag.

It is still another object of this invention to alter area distribution of the structures associated with wing-mounted engines to prevent ambient airflow from achieving supersonic velocity.

These and other objects will be more fully understood from the drawings and from the following description, all of which are intended to be representative of, rather than in any way limiting on, the scope of the invention. Briefly, in one embodiment of the present invention, a fairing is provided on a broad portion of the inboard side of the pylon. The fairing modifies the channel area distribution, as that affects the ambient airflow, for the purpose of preventing the flow from achieving supersonic velocities, shocking, separating and causing excessive drag. The position of the fairing, relative to the engine and engine exhaust flows, is tailored to properly effect ambient airflow.

In another embodiment, a bump is provided at the inboard intersection between the wing and pylon also for the purpose of altering channel area distribution of the surrounding structures, as experienced by ambient airflow, thereby preventing the airflow from achieving supersonic velocities. The bump extends essentially the entire length of the pylon-wing intersection, has a cross section generally resembling a quadrant, and is tapered at both ends. In still another embodiment, the bump is somewhat shorter and is positioned on only a forward portion of the pylon.

DESCRIPTION OF THE DRAWINGS

While the specification concludes with the claims distinctly claiming and particularly pointing out the invention described herein, it is believed that the invention will be more clearly understood by reference to the discussion below in conjunction with the following drawings:

DESCRIPTION OF THE PREFERRED EMBODIMENT

Figure 1:
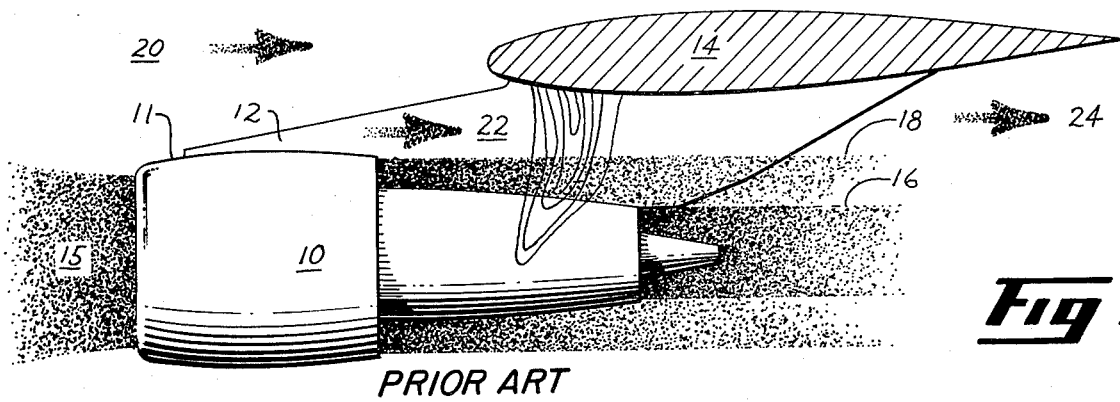
FIG. 1 is an elevation view of a wing-mounted turbofan engine and associated gas stream flow patterns.

Referring now to FIG. 1, a conventional wing-mounted turbofan engine 10 and nacelle 11 are shown suspended by a pylon 12 from an airplane wing 14. Also shown are gas flow regions existing during aircraft flight conditions including an inlet pre-entry streamtube 15 flowing into the engine 10, a primary jet flow 16 and fan jet flow 18 both emanating from the engine. A portion of ambient airflow 20 surrounding the engine becomes channel flow 22 between the wing and engine, and finally exit flow 24. These basic flow regions constitute a simplified representation of gas flows around the engine and will be used throughout this description for explanation purposes.

As it relates to the present invention, the critical region of this flow field is the channel flow 22 in the space between the wing 14 and the engine 10. In the channel flow 22, a large volume of the airflow 20 enters a relatively small area, hereinafter referred to as the channel area, between the compressed fan jet flow 18 and the wing 14. As a result of aerodynamic interaction of the engine nacelle, pylon, and wing, the channel flow 22 is extremely complex, producing more aircraft drag than would be caused by the nacelle, pylon, and wing as isolated elements.

Figure 2:
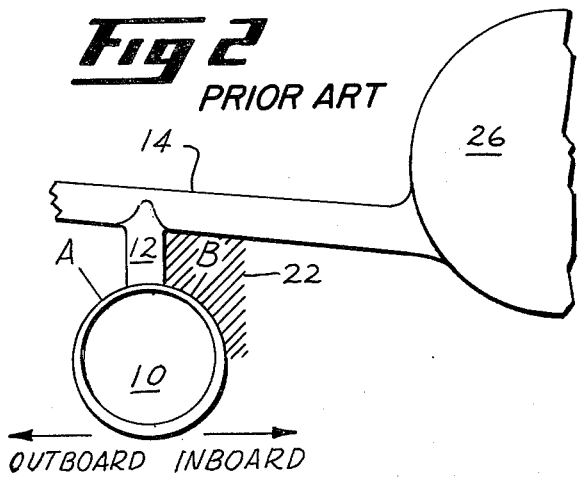
FIG. 2 is a front view of the wing-mounted turbofan engine shown in FIG. 1 and a portion of a wing and fuselage of an airplane.

In an effort to locate and understand what causes this excessive aircraft drag, a test program was conducted to analyze gas pressures in the channel flow region. Referring now to FIG. 2, pressures were measured, both on an outboard side of the engine at position A (the outboard side being that which faces away from fuselage 26), and on an inboard side at approximately position B (the inboard side being that which is closer to and faces towards the fuselage 26).

Figure 3:
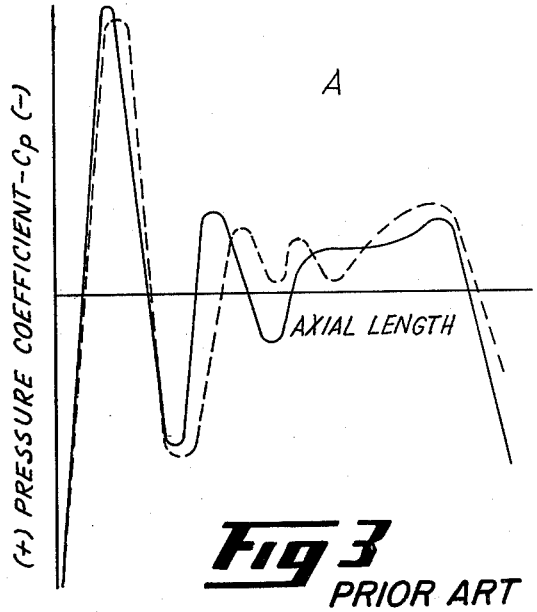
FIG. 3 is a graphical representation of pressure coefficient Cp of gas flow outboard of a wing-mounted engine, at position A shown in FIG. 2, as a function of axial length along the engine.

The results of pressure measurement on the outboard side of the pylon are plotted in FIG. 3. The solid line represents pressure conditions with the engines operating during aircraft cruise, and the dashed line represents pressure conditions with the engines operating while the aircraft is on the ground and not moving.

Figure 4:
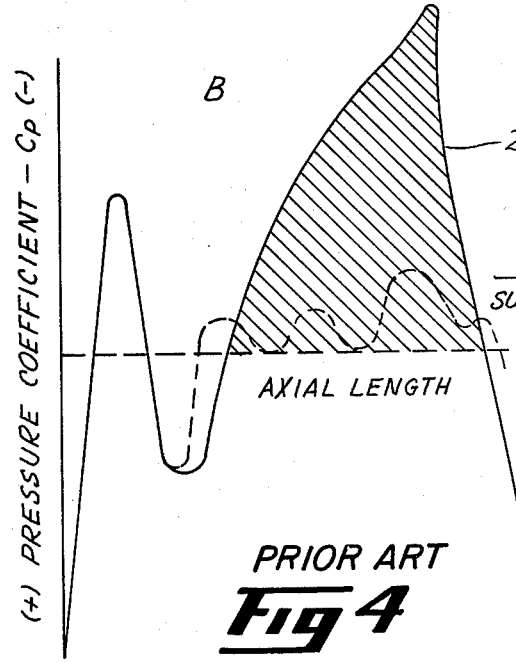
FIG. 4 is a graphical representation of pressure coefficient Cp of gas flow inboard of a wing-mounted engine, at position B shown in FIG. 2, as a function of axial length along the engine.

Results of pressure measurement on the inboard side B are plotted in FIG. 4. Again, the solid line represents pressure conditions at cruise and the dashed line represents static pressure conditions.

In a comparison between the pressure coefficients shown in FIGS. 3 and 4, it becomes obvious that pressure coefficients on the inboard side drop to more severely and adversely negative values than on the outboard side. A sonic-subsonic line is included in FIG. 4 to emphasize a severely elevated flow characteristic, exceeding Mach 1 (the speed of sound) of the ambient airflow, as emphasized by a shaded portion 28 of the pressure values. This happens even though the aircraft is flying at subsonic Mach numbers, for example, 0.75 to 0.85. The inventor has discovered that airflow on the inboard side of the engine exhibits this flow characteristic because the channel area distribution on the inboard side of the pylon results in an area—axial length characteristic, shown by a solid line representation 30 in FIG. 5. When ambient airflow experiences this type of area distribution, characterized by a sharp reduction in area followed by a sharp expansion, the flow will become supersonic, then shock and separate, resulting in high aircraft drag. This would account for the supersonic nature of the channel flow as indicated by the shaded portion 28 in FIG. 4.

A primary object of the present invention is to prevent the channel flow 22 (FIG. 2) from experiencing a large negative pressure coefficient and consequently becoming supersonic. A means to accomplish this objective, as devised by the inventor, is to alter the channel area distribution. The goal is to eliminate the rapid compression and expansion by maintaining the lower level of channel area for a greater portion of the axial length of the pylon and engine thereby separating the rapid compression from the rapid expansion. This lessens any nozzle-like effect of the channel area distribution. One desired channel area distribution is shown by a shaded portion 32 in FIG. 5.

Figure 5:
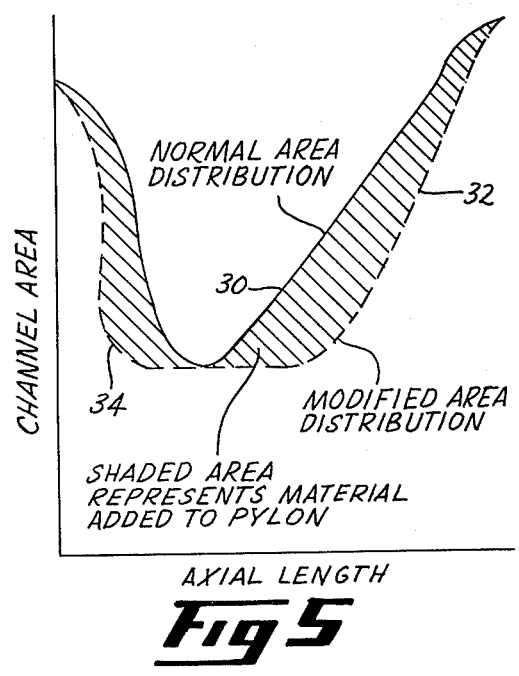
FIG. 5 is a graphical representation of channel flow area as a function of axial length along an inboard side of a wing-mounted gas turbine engine of the type shown in FIGS. 1 and 2.
Figure 6:
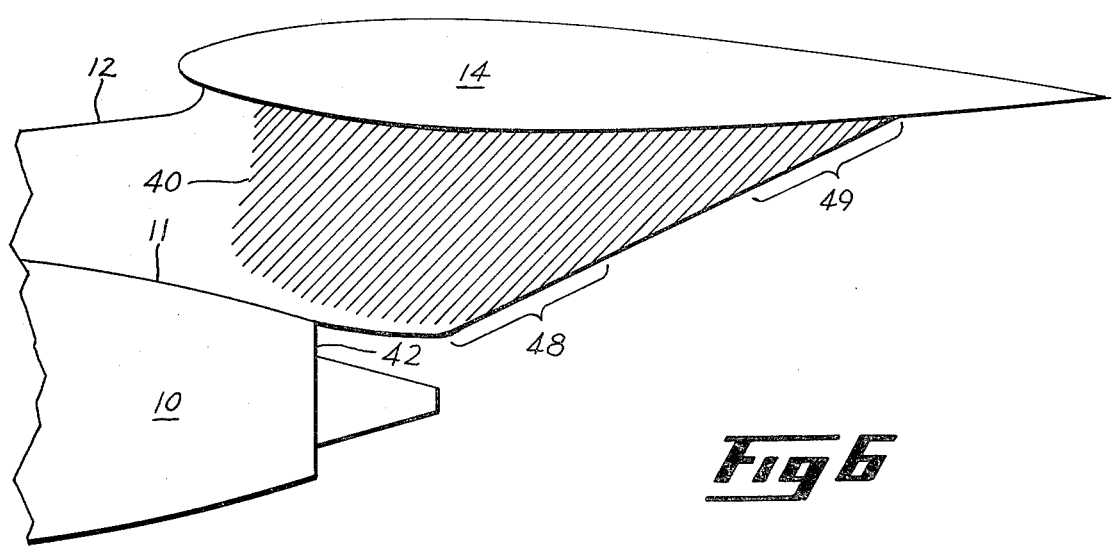
FIG. 6 is an elevation view of a pylon and wing incorporating one embodiment of the present invention.
Figure 7:
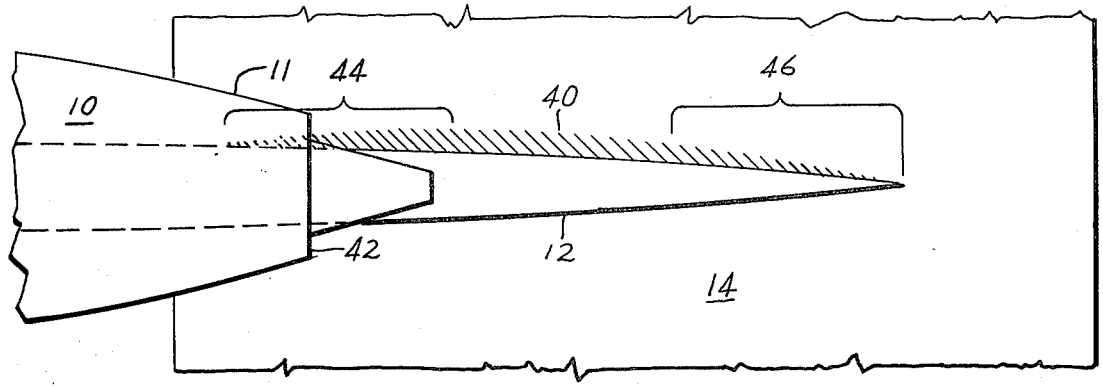
FIG. 7 is a bottom view of the pylon, wing and the embodiment of the present invention shown in FIG. 6.

Presented here are two embodiments of the present invention, both of which modify this channel area distribution in a desired manner. A first embodiment, shown in FIGS. 6 and 7, is essentially comprised of a broadly shaped fairing shown by shaded portion 40 that is strategically positioned on the inboard surface of the pylon 12 to provide a modified channel area distribution, represented by shaded portion 32 shown in FIG. 5. The exact contours of this fairing 40 will vary slightly depending on the configuration of the engine 10, nacelle 11, the pylon 12, and the wing 14. The fairing shown in FIGS. 6 and 7 is contoured to appropriately modify the channel area distribution of an existing commercial jetliner equipped with a turbofan engine.

In the embodiment shown in FIGS. 6 and 7, the fairing forms a nonaxisymmetric pylon contour causing the inboard surface to become broadly and outwardly curved at a generally aft region of the pylon from approximately the middle region of the pylon to its trailing edge. The fairing is positioned at the aft region of the pylon primarily because this portion is located vertically above the nozzle exit 42 of the engine 10 and below the majority of the underside of the wing 14 where the channel flow occurs and critically affects ambient airflow velocities.

The fairing has forward and rear portions, generally shown in FIG. 7. The forward portion 44 begins at an essentially mid-span position along the pylon that is forward of a region where the surrounding airflow would otherwise attain supersonic velocities. This forward portion 44 compresses and accelerates the airflow upstream of the supersonic region. The rear portion 46 of the fairing 40 is tapered for the purpose of expanding and decelerating the airflow thus preventing the flow from accelerating in the region where it would otherwise become supersonic.

The fairing 40 also has upper and lower regions that are generally indicated in FIG. 6. The lower region 48 is tapered to a lower edge terminating above an extreme lower portion of the pylon 12 allowing the fairing to generally blend into existing pylon contour along a border vertically separated from the nozzle exit 42 of the engine 10. The upper region of the fairing is not inwardly tapered where it intersects directly with the wing 14, but, rather, is outwardly curved to blend into the wing structure.

Figures 8, 9:
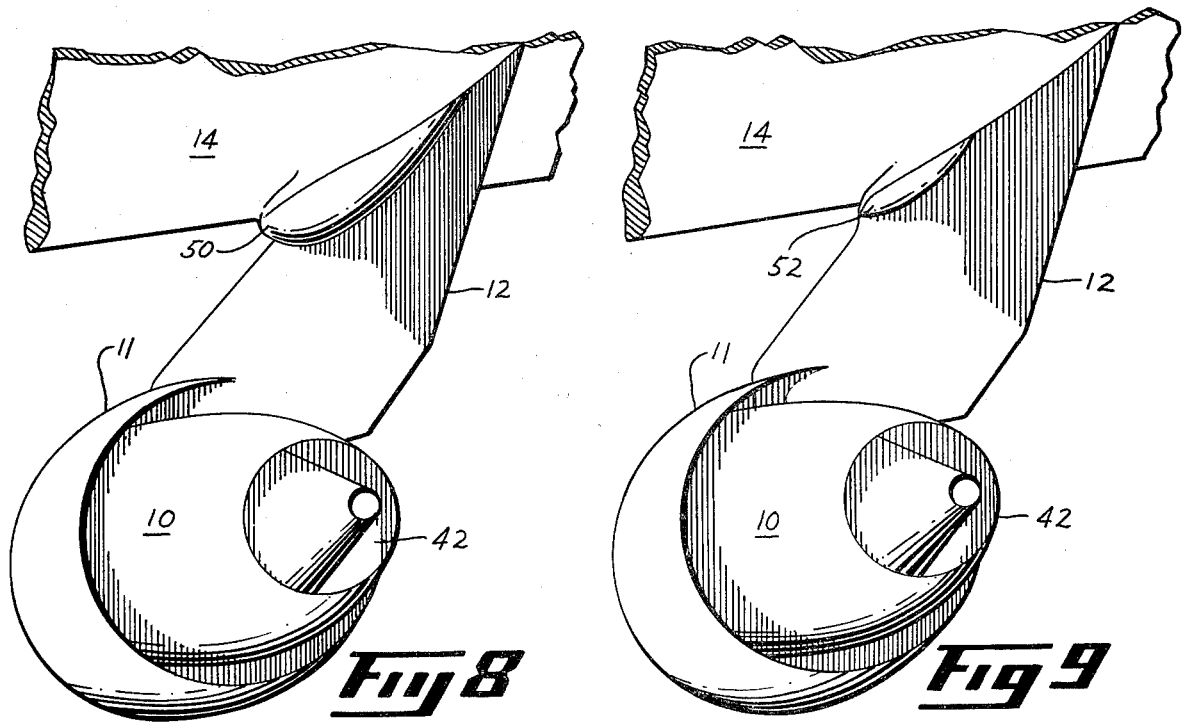
FIG. 8 is a perspective rear view of a pylon and wing incorporating an alternate embodiment of the present invention.
FIG. 9 is a perspective rear view of a pylon and wing incorporating an alternate embodiment of the present invention.

An alternate embodiment of the invention, shown in FIG. 8, is a bump 50 that also appropriately modifies channel area distribution in essentially the same manner as does the fairing. Again, the purpose of the bump is to axially extend the relatively constricted channel area to arrive at a modified channel area distribution represented by the dashed outline 32 on FIG. 5.

Referring again to FIG. 8, the bump 50 is mounted at the inboard intersection between the wing 14 and the pylon 12. The bump comprises an aerodynamically shaped outward protuberance being tapered at its forward and aft ends and having a cross section, taken along a vertical plane, that approximates a quadrant of a circle. The bump is positioned at the intersection with the upper radius of its quadrant-shaped cross section abutting and conforming to the undersurface of the wing 14, and the lower radius abutting and conforming to the inner surface of the pylon 12. The bump thus forms a structure that is aerodynamically integrated into the present wing and pylon contours and appropriately modifies the channel area distribution.

Referring now to FIG. 9, an alternate embodiment of a bump 52 is shown that is somewhat similar in configuration to the fairing shown in FIG. 8, but differs in that it extends over a lesser portion of the length of pylon 12. While the general configuration is similar, the shorter bump shown in FIG. 9 affects the channel area at a forward portion of the channel rather than the rear portions affected by the previously described bump. This creates a channel area distribution represented by shaded area 34 as shown in FIG. 5.

While specific embodiments have been described, it will be apparent to those skilled in the art that various modifications thereto can be made without departing from the scope of the invention, as recited in the appended claims. The scope of the invention, therefore, is to be derived from the following claims.

Having described the invention, what is claimed as novel and desired to be secured by Letters Patent of the United States is:

1. In an aircraft of the type having a wing-mounted gas turbine engine attached to a pylon that extends downward and forward of said wing, said pylon presenting an essentially narrow and aerodynamic forward profile with broad outwardly curved inboard and outboard surfaces forming tapered forward and aft ends on said pylon, an improvement comprising:
    a modified nonaxisymmetric pylon contour, wherein the inboard surface of said pylon is provided with a broadly curved outward fairing added to existing pylon contour for the purpose of preventing surrounding ambient airflow from attaining supersonic velocities during subsonic aircraft flight conditions, and
    wherein said fairing is positioned upon an aft region of said pylon from approximately a mid-span position on the pylon to a trailing edge of the pylon.

2. The apparatus recited in claim 1, wherein said fairing has forward and rear portions and the forward portion extends outwardly from an essentially mid-span position along the inboard surface of the pylon, forward of a region wherein the surrounding ambient airflow would otherwise attain supersonic velocities during subsonic aircraft flight operation, and wherein said fairing is tapered at the rear portion for the purpose of decelerating said airflow thereby essentially preventing surrounding ambient airflow from attaining supersonic velocities.

3. The apparatus recited in claim 2 wherein said fairing has upper and lower regions;
    said lower region being tapered to a lower edge terminating above an extreme lower portion of said pylon at a location generally above a nozzle exit of said engine, said lower region essentially blending into existing pylon structure at said lower edge; and
    said upper region being outwardly curved and blending with existing wing structure.

4. In an aircraft engine of the type having a wing-mounted turbofan engine suspended by a pylon that extends downward and forward of said wing, said pylon presenting an essentially narrow and aerodynamic forward profile with broad outwardly curved inboard and outboard surfaces forming tapered forward and aft pylon ends and forming and inboard and outboard intersection with said wing, an improvement comprising:
    a bump mounted at the inboard intersection between the wing and the pylon for the purpose of preventing surrounding ambient airflow from attaining supersonic velocities during subsonic aircraft flight conditions.

5. The apparatus recited in claim 4 wherein said bump comprises an aerodynamic protuberance extending outward from said intersection and having tapered forward and aft ends.

6. The apparatus recited in claim 5 wherein a vertical cross section of said bump generally forms a quadrant having upper and lower radii with the upper radius positioned against said wing and the lower radius positioned against said pylon thereby forming an integral structure with the inboard wing and pylon intersection.

7. The apparatus recited in claim 5 wherein said bump is mounted on only a forward portion of the pylon.

8. In an aircraft of the type having a wing-mounted gas turbine engine suspended by a pylon that extends downward and forward of said wing, said pylon presenting an essentially narrow and aerodynamic forward profile with broad outwardly curved inboard and outboard surfaces forming tapered forward and aft ends on said pylon, an improvement comprising:
    a modified, nonaxisymmetric pylon contour wherein the inboard surface of the pylon is provided with means to modify axial area distribution of a channel region generally formed between the engine, pylon, and wing, for the purpose of preventing airflow in this region from attaining supersonic velocities during subsonic aircraft flight operation.

* * * * *